April 3, 1951            C. A. WEST            2,547,800
TEMPERATURE CONTROLLED ACTUATING MECHANISM
Filed April 14, 1948            3 Sheets-Sheet 1
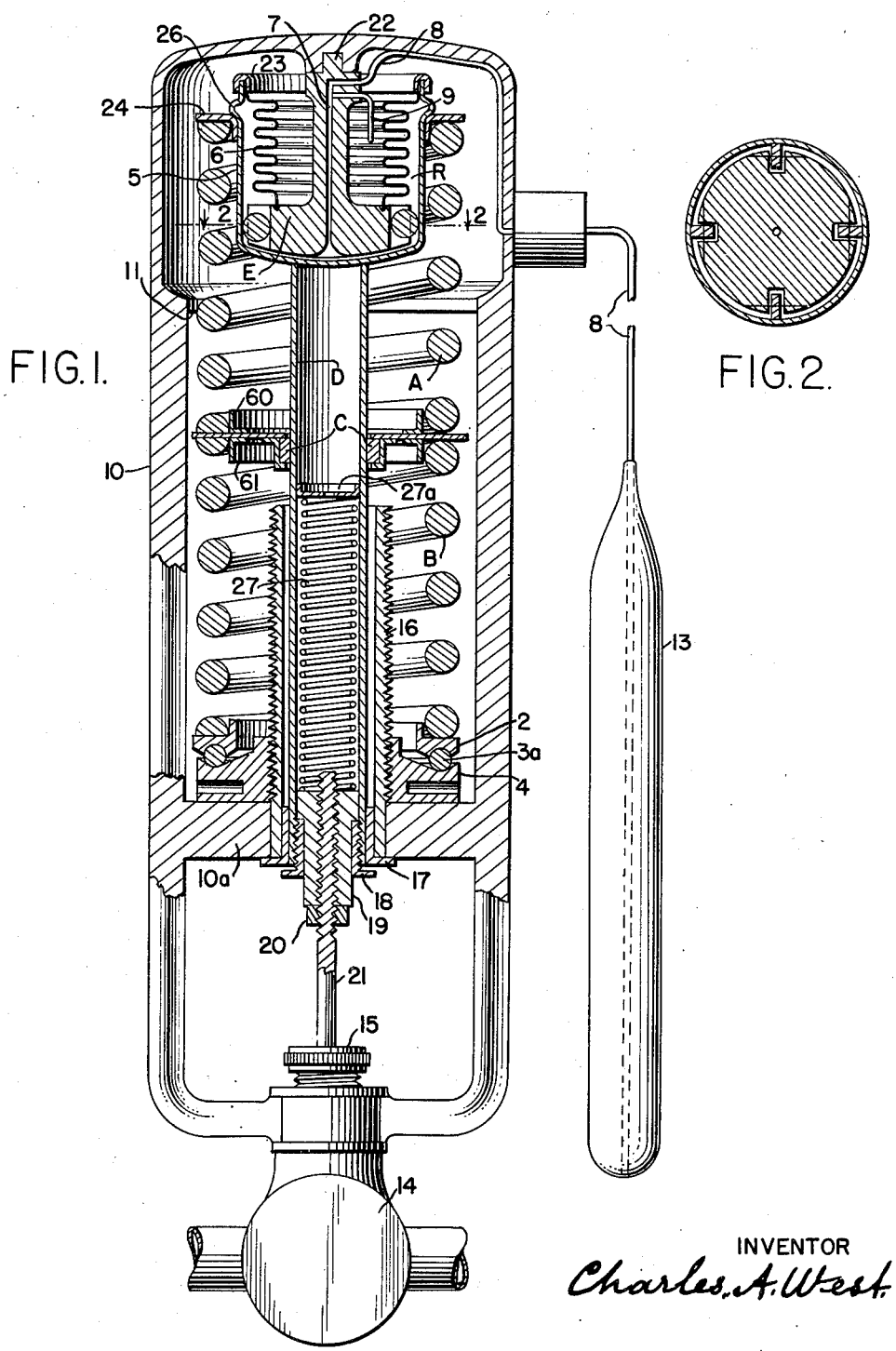
INVENTOR
Charles A. West April 3, 1951        C. A. WEST        2,547,800
TEMPERATURE CONTROLLED ACTUATING MECHANISM
Filed April 14, 1948        3 Sheets-Sheet 2

INVENTOR
Charles A. West.

April 3, 1951 C. A. WEST 2,547,800
TEMPERATURE CONTROLLED ACTUATING MECHANISM
Filed April 14, 1948 3 Sheets-Sheet 3

INVENTOR
Charles A. West

Patented Apr. 3, 1951

2,547,800

UNITED STATES PATENT OFFICE 2,547,800

TEMPERATURE CONTROLLED ACTUATING MECHANISM

Charles Alfred West, Southbridge, Mass.

Application April 14, 1948, Serial No. 21,014
In Great Britain March 15, 1948

4 Claims. (Cl. 236—99)

This invention relates to mechanism adapted to perform a mechanical operation such as opening or closing a valve under the automatic control of a temperature-responsive device. It is the general object of my invention to improve the construction of such mechanism as before known in such manner as to provide more rapid response, greater sensitivity and more satisfactory performance.

My invention further relates to arrangements and combinations of parts which will be hereinafter described and more particularly pointed out in the appended claims.

In self-acting controllers it is usual to provide a helical compression spring to move the valve stem and valve disc of the controlled valve towards the normal position when the pressure or temperature-responsive medium contracts.

In such a spring equipped controller the sensitivity of the instrument and therefore also the speed of response of the instrument depends very largely upon the physical characteristics of the spring provided.

The higher the sensitivity is made the more efficient the controller becomes, and the more accurate is the control. Other things remaining the same the sensitivity of the controller is increased by increasing the number of coils in the helical compression spring. However with long springs of many coils the true shape in compression is not and cannot be preserved and the spring assumes a snake-like or S form, the coils being thrown out of alignment relatively to each other, causing irregularities in action and adding to the torsional stress.

The sideways distortion or buckling is usually greatest about the middle portion of the spring, but the sideways deflection of the ends of the spring is often considerable. Also this sideways deflection in many cases causes the spring or other parts to come into contact with and rub against other parts of the instrument giving rise to objectionable friction which interferes with the free movement, efficiency and accuracy of the controller. It has therefore in most controllers of this type been found advantageous to limit the number of coils to a comparatively small number, thus causing the sensitivity to be correspondingly small.

One object of the present invention is to provide a means of increasing the number of coils or helices and at the same time decreasing the deleterious sideways distortion or deflection at the centre and ends of the spring and thus very considerably increasing the sensitivity and efficiency of the controller.

The sensitivity of the controller may also be increased by increasing the overall diameter of the spring.

This invention is capable of serving a variety of mechanical applications some of which are shown in the accompanying drawings, but it is to be expressly understood that the drawings are for purposes of illustration only and are not to be construed as a definition of the limits of the invention, reference being had to the appended claims for that purpose.

When the controller is in action there are two forces opposing each other, the upward spring force tending to raise the valve stem, and the downward force due to the vapor pressure in the bellows member tending to lower the valve stem. When these two forces balance each other the valve stem remains stationary and the flow of steam through the valve remains constant. When the temperature of the temperature-responsive medium rises the vapor pressure increases and the downward force overcomes the spring force and the valve stem moves downwards until the two forces again balance or the valve is completely closed, and vice versa when the temperature of the bulb falls.

The delicate balancing of these two forces affects the efficiency of the controller.

If an appreciable amount of friction appears the movement of the valve stem is seriously retarded and the efficiency of the controller is reduced.

Referring to the drawings two controllers are shown in each of which instead of one spring being shown two springs are shown arranged in tandem or series with a guiding bearing intermediate between the two springs to eliminate any sideways deflection at the middle portion of the two-spring combination.

It will be evident that instead of two springs in tandem, the number of tandem springs could be increased to three or more with a corresponding increase in the number of intermediate bearings.

Three tandem springs are shown in one of the drawings.

In self-acting controllers heretofore used one end of the bellows member is fixed and the other end free to move, which it does under the varying pressure due to the changes in the temperature of the temperature-responsive medium used. The movable end of the bellows member is usually attached to a movable member and this in turn moves the drive stem and valve stem longitudinally. Generally the movable end of the bellows member moves sideways as well as longitudinally. This sideways deflection is generally due to the sideways deflection of the spring and causes a sideways movement of the valve stem. This in turn affects the packing in the stuffing box of the valve causing the passage in the packing through which the valve stem passes to become oval and gives rise to a leakage of steam. Operators then usually tighten down the stuffing box gland to stop the leak. This causes very considerable friction on the valve stem and seriously interferes with the sensitive functioning of the controller.

It is one object of my invention to provide an anti-friction bearing between the cup and the bellows or between the cup and the hub to prevent the sideways deflection of the bellows with its attendant troubles. This anti-friction bearing should be oilless so as not to contaminate the temperature-responsive medium used, the latter serving as a continuous lubricant always surrounding the bearing. This bearing centers the upper end of the drive stem. The other end of the drive stem is centered by the sliding fit between the drive stem and the anti-friction bearing in the lower end of the hollow adjusting screw.

Briefly then the main objects of this invention are—

1. To ensure by suitable antifriction bearings that the longitudinal motion of the drive stem is rectilinear and co-axial with the longitudinal axis of the chassis frame thus obviating the objectionable side thrust of the valve stem on the packing of the stuffing box with its resultant troubles.

2. By using the thus controlled drive stem as a guide for the intermediate spring guiding bearing to prevent any sideways deflection of the two adjacent ends of the two compression control springs and so allowing the use of a considerably increased number of coils and thus materially increasing the sensitivity and speed of response of the controller.

3. Further increasing the sensitivity of the instrument by locating the compression control springs outside instead of inside the bellows and cup and the hollow adjusting screw, thus allowing a larger diameter of the springs.

A preferred form of my invention is shown in Fig. 1 of the drawings and two other useful forms are shown in Figs. 3 and 4.

Fig. 1 is a part sectional elevation of one form of my improved temperature actuated mechanism.

Fig. 2 is a horizontal section through the cup and pulleys along the line 3—3 of Fig. 1.

Figure 3:
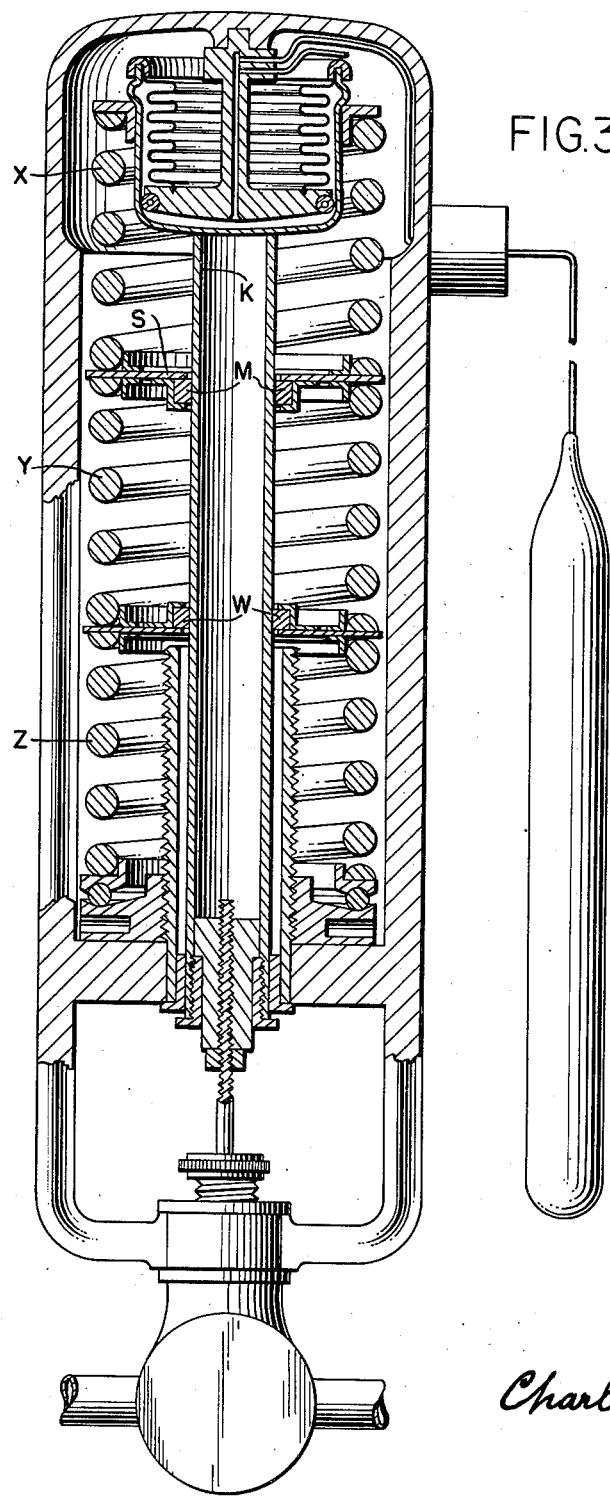
Fig. 3 is a part sectional elevation of a controller using three instead of two tandem control springs.

Referring again to Fig. 1 my improved mechanism here shown comprises a chassis frame consisting of a hood 11 having a depending open frame 10 adapted to be mounted on a valve 14 of any suitable construction, provided only that the valve may be opened and closed by axial movement of a valve stem 21 slidable in a stuffing-box 15.

The valve stem 21 is mounted in a rotatable threaded sleeve or stem coupling 19 and may be secured in axially adjusted position by a locknut 20. The sleeve 19 is slidable in a collar 18 screwed into the lower end of the drive stem D, and a shoulder on the sleeve 19 is normally held against the collar 18 by a coil spring 27 which at its upper end engages a flanged collar 27a attached to the drive stem D.

The spring 27 and the sleeve 19 provide a safety release for the valve 14 if the temperature continues to rise and the pressure continues to increase after the valve 14 is fully closed. In this event the collar 18 and the drive stem D are pushed downwards along the sleeve 19 and no damage is done to the valve actuating mechanism.

The drive stem D is fixed by any suitable means to the centre of the cup 5. The upper edge of the cup 5 is securely attached by soldering to the upper flange of the tubular bellows 6 the lower end of the bellows being similarly fixed to the expanded end of the hub E.

The cup 5, the bellows 6 and the hub E define an enclosed space forming an annular pressure chamber R communicating by a passage 7 in the stem of the hub E and the capillary 8 with the bulb 13.

The cup 5 is of a somewhat larger internal diameter than the overall diameter of the bellows member 6, providing a fairly wide clearance between the bellows 6 and the cup 5, to minimise risk of rubbing and wear of the thin walled bellows.

The upper end of the cup 5 and the upper end of the bellows 6 although joined together may jointly suffer from sideways deflection due to any sideways distortion of the compression springs causing contact and rubbing between the lower movable end of the cup 5 and the lower end of the bellows 6. This contact between bellows 6 and cup 5 may be obviated by making the overall diameter of the expanded end of the hub E intermediate between the overall diameter of the bellows 6 and the internal diameter of the cup 5. The hub E would then protect the bellows but there may then be friction between the hub E and the cup 5.

This friction in either case may be guarded against by providing antifriction pulleys pivoted in radial slots in the expanded portion of the hub E arranged so that neither the hub E nor the bellows 6 can make contact with the cup 5. An arrangement of this kind is shown in Fig. 1 and also in Fig. 2 which shows a horizontal section along the line 3—3 of Fig. 1 taken through the cup and the antifriction pulleys. The number of pulleys may be three or more but Fig. 2 shows four pulleys. No oil should be used on these anti-friction pulleys as it may contaminate the temperature-responsive medium used and it is unnecessary because the temperature-responsive medium always surrounds the pulleys and acts as a continuous lubricant.

The cup 5 is thus centered and so is the upper end of the drive stem D, attached to the center of the closed end of the cup 5.

The valve 14 is normally held open by two heavy tandem compression coil springs A and B. The upper end of the spring A is centered by being seated on a flanged collar 24 resting on an expanded bead 26 on the exterior of the cup 5 near its upper end and centered at its lower end by a flanged collar 60 on the frame of the intermediate anti-friction bearing C. The upper end of the lower spring B is similarly centered by the flanged collar 61 and seated on the frame of the bearing C and its lower end is seated and centered on a flanged collar 2 forming the upper plate of the ball bearing 3a, the adjusting nut 4 functioning as the lower plate of the ball bearing 3a. The adjusting nut 4 is provided with radial holes by means of which it may be turned and its position adjusted. The anti-friction bearing C is freely slidable on the drive stem D. The drive stem D is centered at its upper end by the pulleys in the attached cup 5 and at its lower end by the anti-friction collar 17 in which it is freely slidable longitudinally and its motion is controlled so that it is rectilinear.

The hollow adjusting screw 16 is securely fixed in the cross-member 10a of the chassis frame 10 and is used for adjusting the compression of the two compression springs A and B. A temperature-responsive device 13 is connected by the capillary 8 and the passage 7 to the annular pressure chamber R between the cup 5 and the bellows 6. A filler tube 9 is provided for exhausting the bulb 13, the capillary tube 8 and the pressure chamber R and introducing the requisite amount of the temperature-responsive fluid after which it is sealed. The device 13 is to be placed wherever the temperature is to be controlled and is partially filled with a selected temperature-responsive liquid, the remainder of the space in the bulb 13, capillary 8 and chamber R being occupied by the vapor of the liquid. The tube 8 extends nearly to the lower end of the bulb 13, so that on rise in temperature and consequent increase of the vapor pressure of the fluid in the bulb 13, a portion of the liquid will be forced upward through the tube 8 to the pressure chamber R and will thus depress the cup 5, the drive stem D and the valve stem 21. This closes the valve 14 to the extent indicated by the rise in temperature.

Lateral displacement or buckling of the two springs A and B on compression is substantially prevented by providing two relatively short springs instead of a single long spring, and by providing the intermediate sliding anti-friction bearing C with the flanged collars 60 and 61 all centered on the closely controlled drive stem D.

The rectilinear motion of the valve stem 21 is thus assured and sideways pressure on the packing of the stuffing box 15 is substantially avoided.

The pressure to which the mechanism responds may be adjusted by turning the adjusting nut 4.

In Fig. 3 is shown a controller similar in construction to that shown in Fig. 1 except that an additional compression spring and an additional intermediate bearing are shown thus allowing the use of a larger number of coils and giving a corresponding increase in sensitivity. The three springs X, Y and Z are arranged in tandem but may vary amongst themselves with regard to diameter and number of coils. S and T are two frames for seating and centering the adjacent ends of the springs X, Y and Z and also for accommodating the two intermediate anti-friction bearings M and W which are both guided by the drive stem K.

Figure 4:
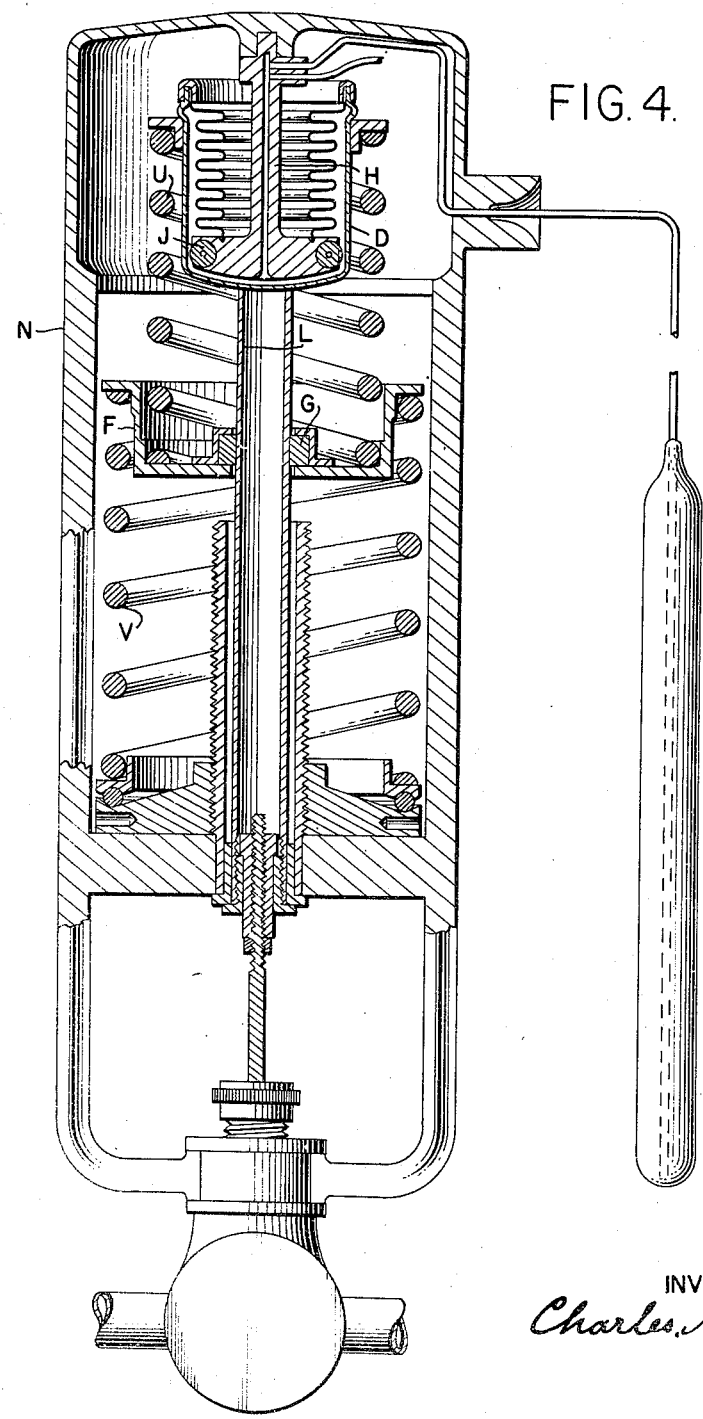
Fig. 4 is a part sectional elevation of a controller using two compression springs of different diameters.

In Fig. 4 is shown a controller similar in construction to that shown in Fig. 1 except that the two springs U and V are shown of different diameters so that the smaller spring U passes freely inside the larger diameter spring V. The adjacent ends of the two springs U and V are seated on and centered by the frame F, the frame F also accommodating the intermediate anti-friction bearing G guided by the drive stem L.

The two dissimilar springs U and V are shown overlapping each other and by varying the dimensions of the frame F the amount of overlapping can be varied to suit various requirements.

By this arrangement the number of coils can be varied (within limits) without increasing the overall length of the chassis frame, and thus the resulting increased sensitivity can be varied.

Having thus described my invention and the advantages thereof, I do not wish to be limited to the details herein disclosed otherwise than as set forth in the claims, but what I claim is:

1. Mechanism for moving a valve under control of a fluid-filled device which is responsive to temperature changes, said valve-moving mechanism comprising a chassis frame, a cup, a bellows support or hub and a bellows member attached at its upper end to the edge of the said cup and fixed at its lower end to an expanded portion of the said hub, the said hub being seated at its upper end on the end of the said chassis frame and centered by a spigot loosely fitting into a central hole drilled in the centre of the end wall of the said chassis frame, the said cup being movable in a straight line longitudinally and co-axially of the said chassis frame on compression or expansion of the said bellows member, a good clearance being provided between the outer surface of the said bellows and the inner surface of the said cup, said bellows member, said cup and said hub defining an enclosed space exterior of the said bellows and in communication with the said fluid-filled device, a tube or drive stem suitably attached to the centre of the closed end of the said cup and depending therefrom and operatively connected to the valve to be moved, a guiding support member or adjusting nut adjustably threaded to a hollow adjusting screw which is secured in the said chassis frame, the said screw being provided internally at its lower end with an anti-friction bearing in which the lower end of the said drive stem is freely slidable in a straight line co-axial with the said chassis frame, a spring centering guide member freely slidable on the said drive stem, a compression coil spring surrounding at a distance said cup and said drive stem and interposed between a flanged collar seated on an expanded bead on the exterior of said cup near its upper end and said guide member and a second compression coil spring surrounding at a distance said drive stem and exterior of said hollow adjusting screw and interposed between said guide member and said guiding support member or adjusting nut, and the ends of the two said springs being centered and held clear of said cup and said drive stem by portions of said flanged collar seated on an expanded bead on the exterior of said cup, the said guide member and said guiding support member or adjusting nut which project within the end portions of the said springs, any sideways deflection of the said cup and any friction between the said cup and said bellows or between the said cup and said hub being obviated by a plurality of anti-friction pulleys symmetrically arranged in a circle concentric with the axis of the chassis frame and pivoted in radial slots in the expanded lower end of the said hub, the axes of the said anti-friction pulleys being in a plane at right angles to the longitudinal axis of the said chassis frame thus facilitating the longitudinal motion of the said cup and said drive stem, the overall diameter of the anti-friction pulleys being such as to allow only a small working clearance between the said pulleys and the inside surface of the said cup.

2. The combination of a valve-moving mechanism as set forth in claim 1 but in which the two compression coil springs are of opposite hand, whereby the tendencies to transverse distortion are to some extent balanced and reduced.

3. The combination of a valve-moving mechanism as set forth in claim 1, but in which the composite spring comprises three or more compression coil springs in tandem and provided with intermediate anti-friction guiding bearings between any two adjacent ends of the said springs.

4. The combination of a valve-moving mechanism as set forth in claim 1, but in which one of the two compression coil springs is of a sufficiently larger diameter than the diameter of the other spring to allow the smaller diameter spring to pass readily inside the larger one, the combination of the two dissimilar springs being provided with a suitable frame so as to co-axially seat the adjacent ends of the two said springs and also accommodate an intermediate anti-friction guiding bearing slidable on the said drive stem.

CHARLES ALFRED WEST.

REFERENCES CITED

The following references are of record in the file of this patent:

UNITED STATES PATENTS

| Number | Name | Date |
|---|---|---|
| 1,137,272 | Moyle | Apr. 27, 1915 |
| 1,936,325 | Carson | Nov. 21, 1933 |
| 2,123,388 | Viguerie | July 12, 1938 |
| 2,202,050 | Gibbons | May 28, 1940 |
| 2,410,290 | Keysor | Oct. 29, 1946 |
| 2,439,706 | West | Apr. 13, 1948 |